(12) United States Patent
Nagasawa et al.

(10) Patent No.: US 12,083,755 B2
(45) Date of Patent: Sep. 10, 2024

(54) OPTICAL DEVICE PRODUCTION METHOD

(71) Applicant: DEXERIALS CORPORATION, Shimotsuke (JP)

(72) Inventors: Yoshikazu Nagasawa, Shimotsuke (JP); Yuko Takebayashi, Shimotsuke (JP)

(73) Assignee: DEXERIALS CORPORATION, Shimotsuke (JP)

( * ) Notice: Subject to any disclaimer, the term of this patent is extended or adjusted under 35 U.S.C. 154(b) by 0 days.

(21) Appl. No.: 17/630,178

(22) PCT Filed: Jul. 22, 2020

(86) PCT No.: PCT/JP2020/028520
§ 371 (c)(1),
(2) Date: Jan. 26, 2022

(87) PCT Pub. No.: WO2021/020295
PCT Pub. Date: Feb. 4, 2021

(65) Prior Publication Data
US 2022/0266553 A1   Aug. 25, 2022

(30) Foreign Application Priority Data

Jul. 29, 2019   (JP) ................. 2019-138981

(51) Int. Cl.
*B29D 11/00* (2006.01)
*B32B 7/12* (2006.01)
(Continued)

(52) U.S. Cl.
CPC ............ *B29D 11/0073* (2013.01); *B32B 7/12* (2013.01); *B32B 17/06* (2013.01); *B32B 37/12* (2013.01);
(Continued)

(58) Field of Classification Search
CPC ....... B29D 11/0073; B32B 7/12; B32B 17/06; B32B 37/12; B32B 2307/412;
(Continued)

(56) References Cited

U.S. PATENT DOCUMENTS

| 7,166,686 B2* | 1/2007 | Olson ................... C07C 327/22 |
| | | 526/329.2 |
| 8,142,249 B2 | 3/2012 | Kobayashi et al. |
| 2010/0197187 A1* | 8/2010 | Naraba ................. G02F 1/1303 |
| | | 445/25 |

FOREIGN PATENT DOCUMENTS

| CN | 101211049 A | 7/2008 |
| CN | 102947091 A | 2/2013 |

(Continued)

OTHER PUBLICATIONS

International Preliminary Report on Patentability issued May 20, 2021 in PCT/JP2020/028520 (with English translation), 6 pages.
(Continued)

*Primary Examiner* — Christopher W Raimund
(74) *Attorney, Agent, or Firm* — Element IP, PLC

(57) ABSTRACT

An optical device producing method includes: Step A of forming a wall portion surrounding an application region for a photocurable resin composition on an optical member or a transparent panel; Step B of applying a photocurable resin composition to the application region; Step C of forming a laminate by laminating the optical member and the transparent panel via the photocurable resin composition under a reduced-pressure atmosphere lower than atmospheric pressure; and Step D of removing babbles in the photocurable resin composition by pressurizing the laminate. In Step B, at least the height of the photocurable resin composition on the side of the wall portion is made higher than the height of the wall portion, and the photocurable resin composition is applied so that the laminate formed in Step C has a plurality (Continued)

of separated spaces separated by bubbles formed in the thickness direction of the photocurable resin composition.

11 Claims, 20 Drawing Sheets

(51) Int. Cl.
*B32B 17/06* (2006.01)
*B32B 37/12* (2006.01)
*G02B 1/14* (2015.01)
*B29K 709/08* (2006.01)

(52) U.S. Cl.
CPC ............ *G02B 1/14* (2015.01); *B29K 2709/08* (2013.01); *B29K 2995/0026* (2013.01); *B32B 2307/412* (2013.01); *B32B 2457/20* (2013.01)

(58) Field of Classification Search
CPC .. B32B 2457/20; G02B 1/14; B29K 2709/08; B29K 2995/0026; B05D 1/32; B05D 3/0493; B05D 3/067; B05D 1/26; B05D 1/265; B05D 3/12; B05D 7/24; B29C 65/4845; B29C 65/524; B29C 66/00145; B29C 66/0322; B29C 65/48; G02F 1/1303; G02F 1/1333; G09F 9/00; B29L 2011/00
See application file for complete search history.

(56) References Cited

FOREIGN PATENT DOCUMENTS

| | | | |
|---|---|---|---|
| JP | 2008158251 A | 7/2008 | |
| JP | 2018128668 A | 8/2018 | |
| KR | 1020080059512 A | 6/2008 | |
| KR | 1020130090769 A | 8/2013 | |
| KR | 1020190072606 A | 6/2019 | |
| TW | 201544330 A | 12/2015 | |
| WO | WO-2011155396 A1 | 12/2011 | |
| WO | WO-2015159957 A1 * | 10/2015 | ............ B32B 27/00 |

OTHER PUBLICATIONS

Written Opinion issued Sep. 24, 2020 in PCT/JP2020/028520 (with partial English translation), 4 pages.
International Search Report issued Sep. 24, 2020 in PCT/JP2020/028520 (with English translation), 5 pages.
Combined Chinese Office Action and Search Report issued Aug. 24, 2023 in Patent Application No. 202080052531.9 (with English translation), 18 pages.
Communication Pursuant to Rules 70(2) and 70a(2) EPC issued Jul. 6, 2023 in Patent Application No. 20846311.7, 1 pages.
Extended European Search Report issued Jun. 19, 2023 in Patent Application No. 20846311.7, 8 pages.
Office Action and Search Report issued Feb. 7, 2024 in Taiwanese Patent Application No. 109125414 (with English translation), 14 pages.
Office Action issued Mar. 9, 2024 in Chinese Patent Application No. 202080052531.9 (with English translation), 15 pages.
Office Action issued Jan. 5, 2024 in Korean Patent Application No. 10-2022-7002152 (with English translation), 12 pages.
Office Action issued Jul. 1, 2024 in corresponding Korean Patent Application No. 10-2022-7002152 (with English translation), 12 pages.

* cited by examiner

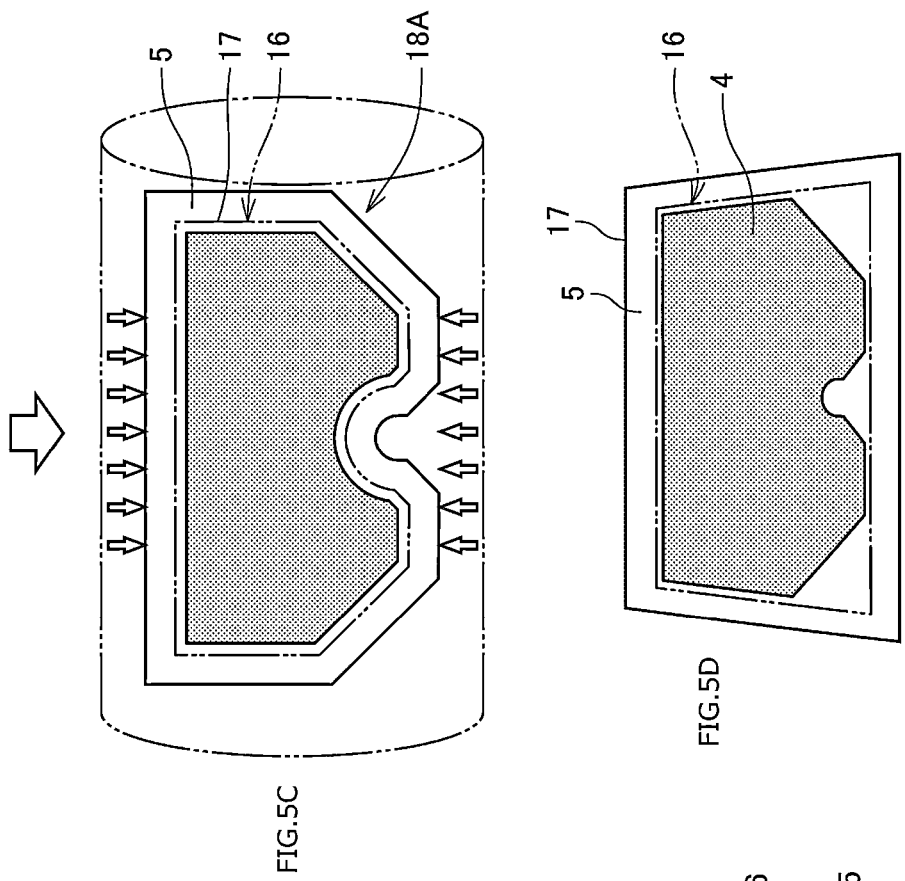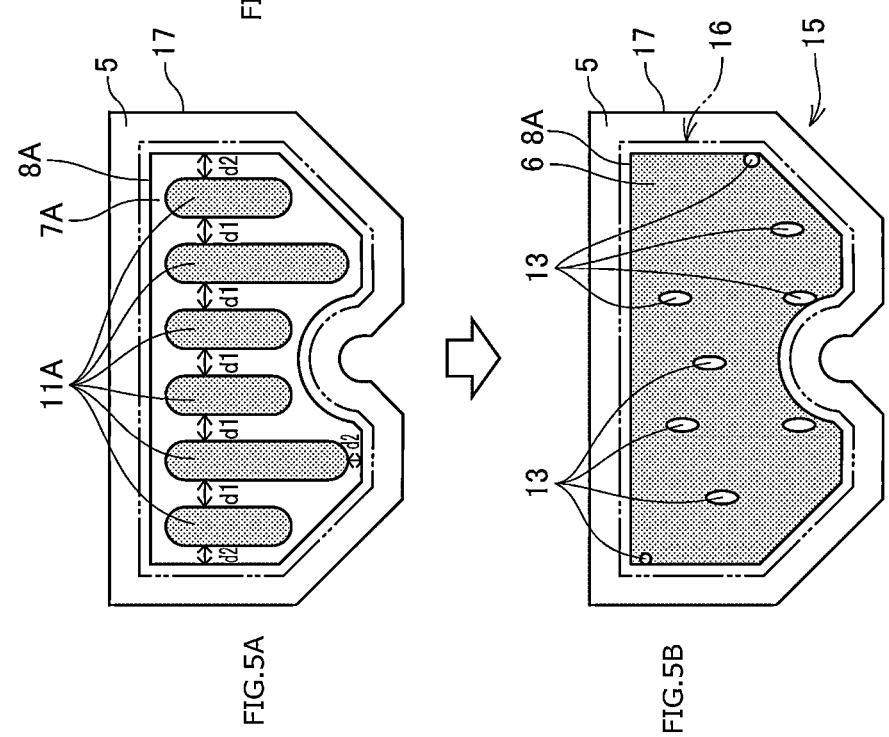

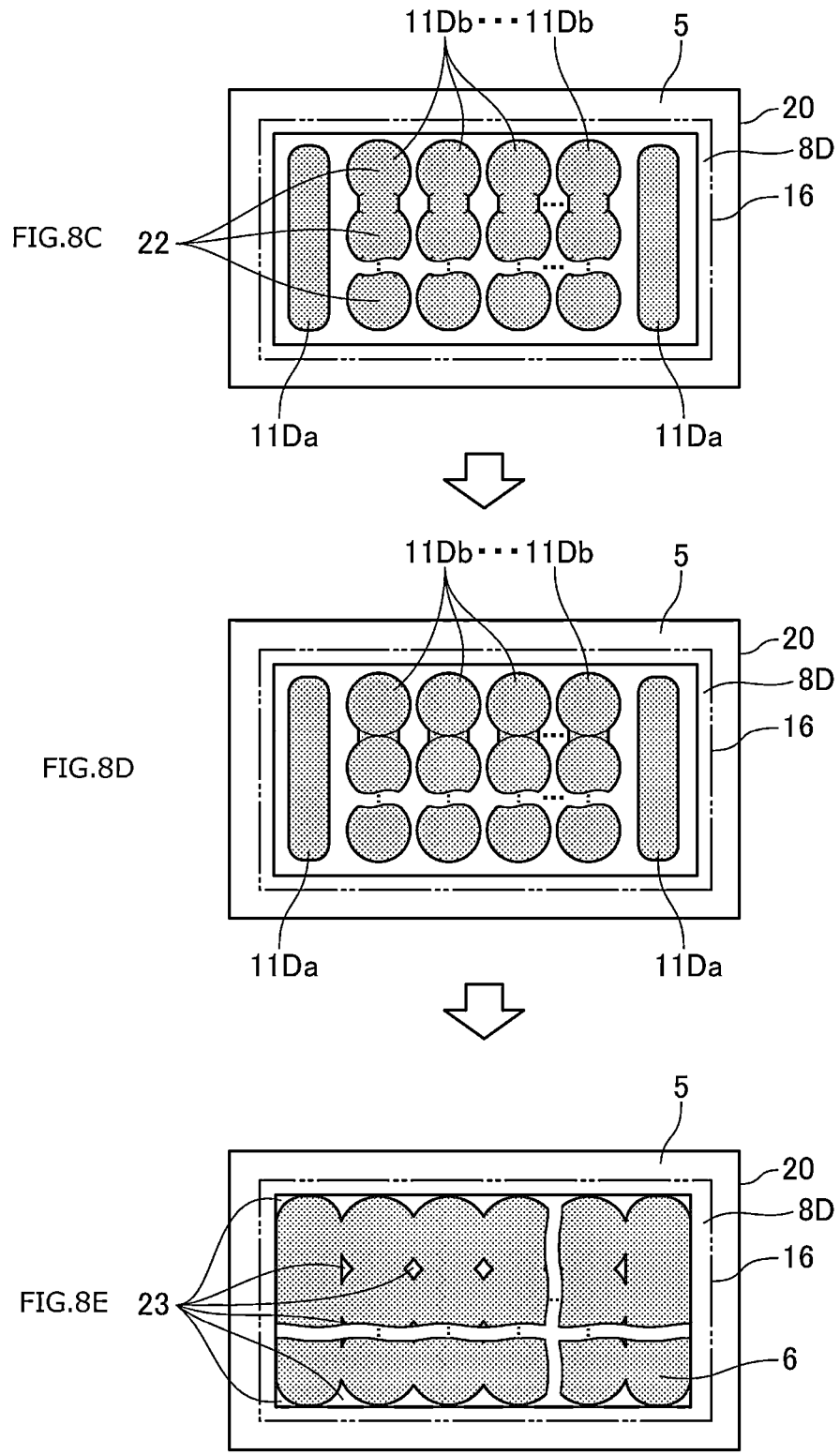

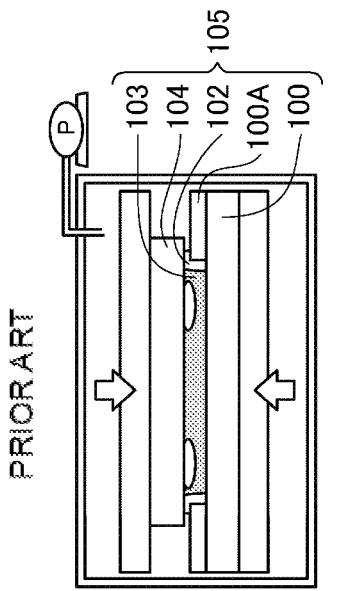
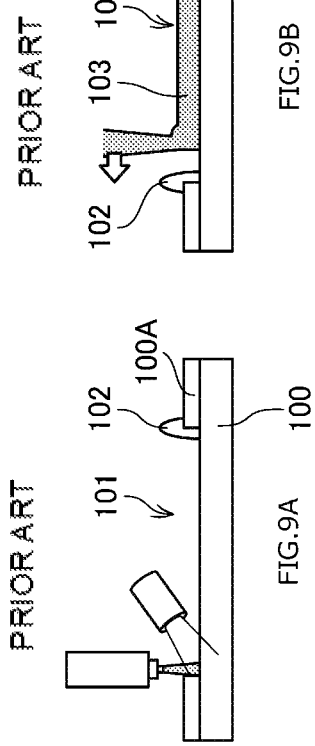
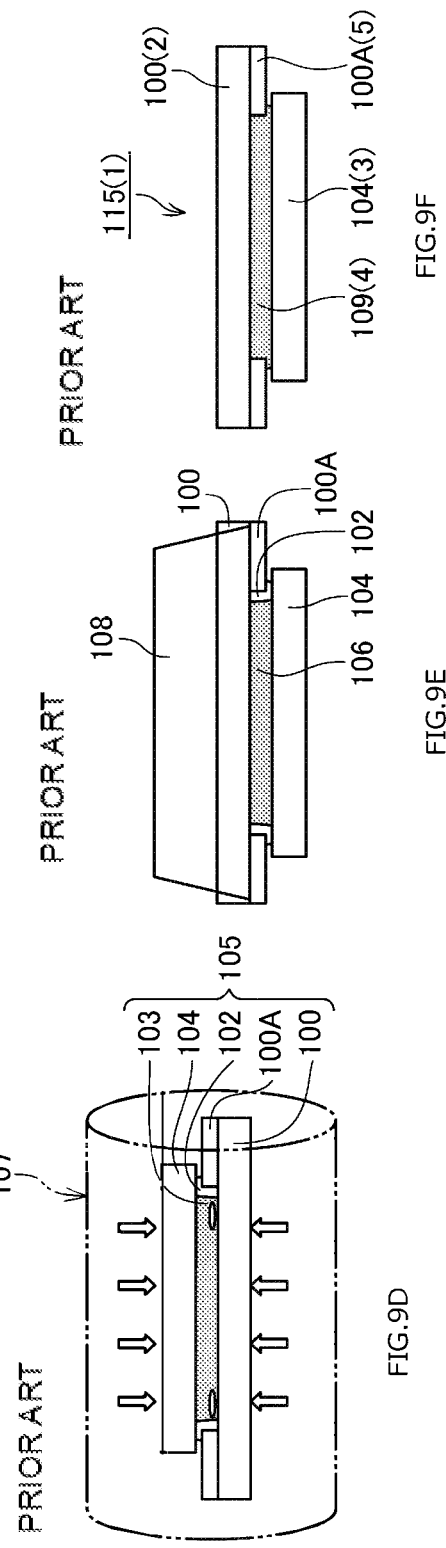

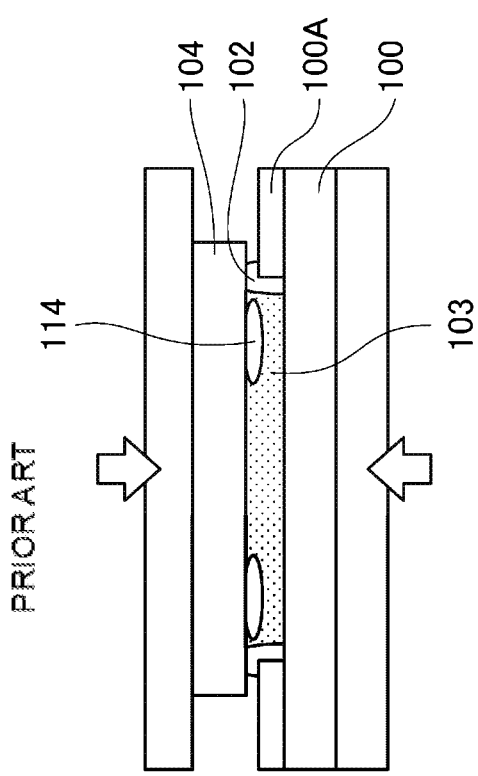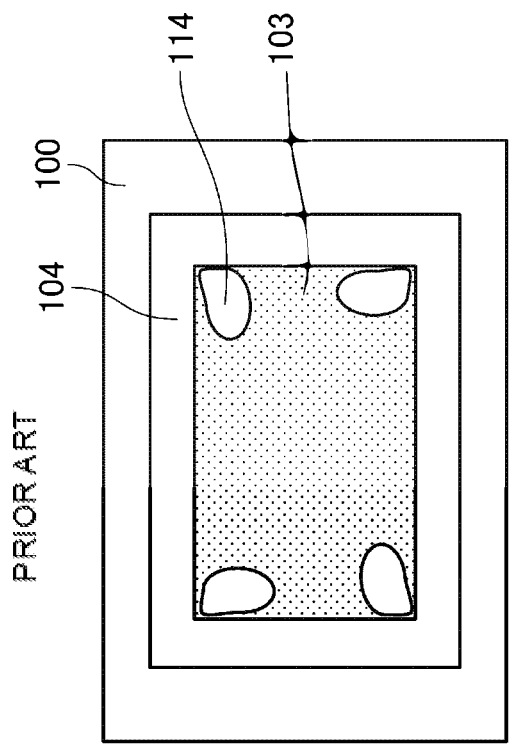
FIG.15A PRIOR ART
FIG.15B PRIOR ART

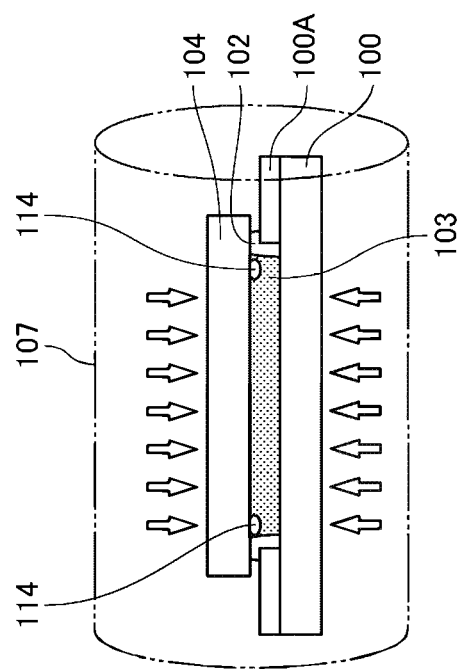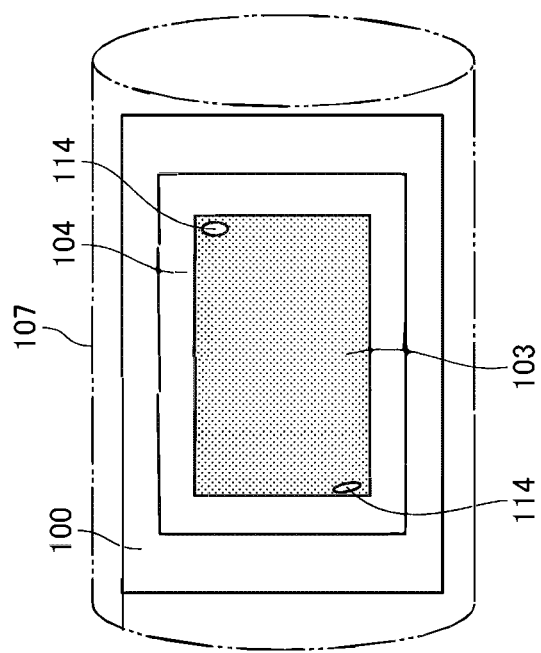
PRIOR ART
FIG.16A
PRIOR ART
FIG.16B

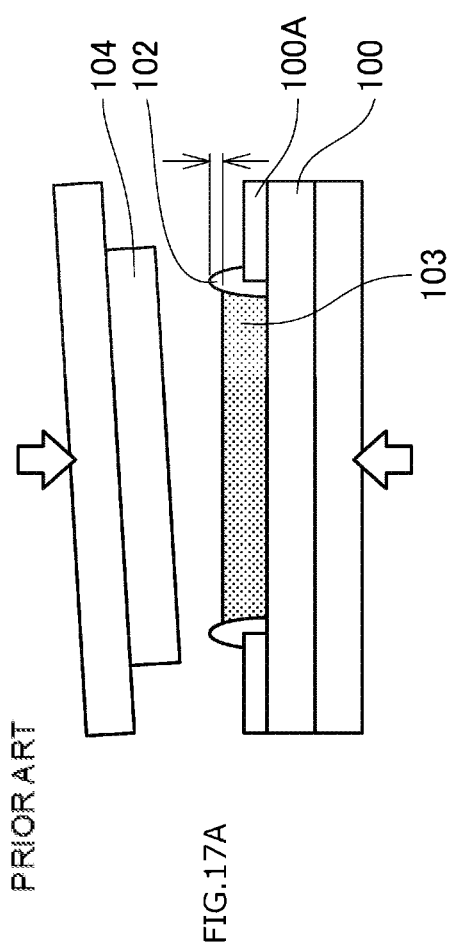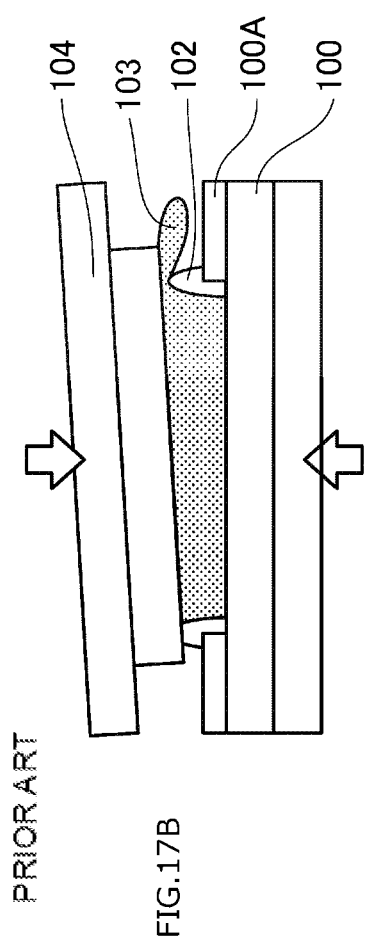
FIG.17A PRIOR ART
FIG.17B PRIOR ART

OPTICAL DEVICE PRODUCTION METHOD

TECHNICAL FIELD

The present technology relates to a method for manufacturing an optical device. This application claims priority based on Japanese Patent Application Serial No. 2019-138981, filed Jul. 29, 2019 in Japan, which is incorporated herein by reference.

BACKGROUND ART

Conventionally, in optical devices such as liquid crystal display devices used in information terminals such as smartphones or car navigation devices, a light-transmissive cured resin layer is provided between an optical member such as a liquid crystal display panel and a transparent panel for protecting the optical member for the purpose of thinning the device and improving visibility.

For example, as shown in FIGS. 9A to 9F, a method for manufacturing an image display device, includes the following Steps a to f (see Patent Document 1).

Step a: a wall portion (also referred to as dam material.) 102 is formed on a transparent panel 100 (for example, a light transmissive cover member) to surround an application region 101 to which a photocurable resin composition (also referred to as fill material) 103 (see, FIGS. 9A and 9B) is to be applied.

Step b: the fill material 103 is applied to the application region 101 (FIG. 9B).

Step c: The transparent panel 100 and an optical member 104 (for example, a liquid crystal display panel) are laminated via the fill material 103 by vacuum laminating to form a laminate 105 (FIG. 9C).

Step d: the laminate 105 is subjected to pressure defoaming treatment by using an autoclave 107 (FIG. 9D).

Step e: the photocurable resin composition layer 106 sandwiched between the optical member 104 and the transparent panel 100 is irradiated with ultraviolet rays 108 to form a cured resin layer 109 (FIGS. 9E and 9F).

Step b shown in FIGS. 9A to 9F employs, for example, a method of applying a photocurable resin composition 103 by using a slit nozzle 110 (FIG. 10A) or a multi nozzle 111 (FIG. 11A) having a narrow pitch (for example, 1 to 2 mm) to spread the fill material 103 uniformly over the entire surface of the application region 101, and or method of applying the fill material 103 having a low viscosity and a rapid wetting and spreading property by using a dispenser 112 in a rough pattern (FIG. 12A).

In Step c shown in FIGS. 9A to 9F, laminating the optical member 104 and the dam material 102 first generally suppresses leakage of the fill material 103 to the outside of the dam material 102 (FIG. 13). After the lamination of the optical member 104 and the dam material 102, the dam material 102 is deformed to laminate the fill material 103 and the optical member 104 (FIGS. 14A and 14B). When the fill material 103 and the optical member 104 are laminated, the fill material 103 comes into contact with the optical member 104 from a certain part 113 to proceed the lamination. The rarefied air confined at the time of lamination aggregates in the final laminating portion as the result of expansion of the fill material 103 in the lamination to form bubbles 114 (FIGS. 15A and 15B).

The bubble 114, having a high density, tends to be hard to remove even in the pressure defoaming treatment using the autoclave 107 in Step d (FIGS. 16A and 16B). As a method for facilitating the removal of the bubbles 114, for example, it is conceivable to make the degree of vacuum during lamination higher in Step c. However, this method is not practical due to the issues of the device cost and the long cycle time. As another method for facilitating the removal of the bubbles 114, it is conceivable to make the height of the dam material 102 as close as possible to the thickness (volume/area) of the fill material 103 (FIG. 17A). However, this method has limitations due to the issues of the height of the dam material 102 and the planar accuracy of the laminator, and there also arises a concern of leakage of the fill material 103 (FIG. 17B). In this method, when a large panel 104A having a large lamination area is used as the optical member 104 (FIG. 18B), the volume of the bubble 114 will be relatively larger as compared with when a small panel 104B is used (FIG. 18A), so that the bubble 114 tends not to disappear easily.

CITATION LIST

Patent Literature

Patent Document: Japanese Unexamined Patent Application Publication No. 2018-128668

SUMMARY OF INVENTION

Technical Problem

An object of the present technology is to provide a method for manufacturing an optical device capable of easily removing bubbles in a photocurable resin composition.

Solution to Problem

A method according to the present technology includes: Step A of forming a wall portion surrounding an application region for a photocurable resin composition on an optical member or a transparent panel; Step B of applying a photocurable resin composition to the application region; Step C of forming a laminate by laminating the optical member and the transparent panel via the photocurable resin composition under a reduced-pressure atmosphere lower than atmospheric pressure; and Step D of removing babbles in the photocurable resin composition by pressurizing the laminate, characterized in that in Step B, at least the height of the photocurable resin composition on the side of the wall portion is made higher than the height of the wall portion, and the photocurable resin composition is applied so that the laminate formed in Step C has a plurality of separated spaces separated by bubbles formed in the thickness direction of the photocurable resin composition.

Advantageous Effects of Invention

According to the present technology, it is possible to easily remove bubbles in a photocurable resin composition.

BRIEF DESCRIPTION OF DRAWINGS

FIGS. 1A and 1B are diagrams for explaining Step B of the method for manufacturing an optical device, in which FIG. 1A is a plan view and FIG. 1B is a sectional view.

FIGS. 2A and 2B are diagrams for explaining Step C of the method for manufacturing an optical device, in which FIG. 2A is a plan view and FIG. 2B is a sectional view.

FIGS. 3A and 3B are diagrams for explaining Step C of the method for manufacturing an optical device, in which FIG. 3A is a plan view and FIG. 3B is a sectional view.

FIGS. 4A and 4B are diagrams for explaining Step D of the method for manufacturing an optical device, in which FIG. 4A is a plan view and FIG. 4B is a sectional view.

FIG. 5A is a plan view for explaining Step B of Example 1 of the method for manufacturing an optical device, FIG. 5B is a plan view for explaining Step C, FIG. 5C is a plan view for explaining Step D, and FIG. 5D is a plan view for explaining the completed laminate.

FIGS. 8C to 8E are plan views for explaining Step C.

FIGS. 9A to 9F are sectional views for explaining a method for manufacturing a conventional optical device, in which: FIG. 9A illustrates a step of forming a wall portion surrounding an application region for a photocurable resin composition on a transparent panel; FIG. 9B illustrates a step of applying the photocurable resin composition to the application region; FIG. 9C illustrates a step of forming a laminate by vacuum laminating the transparent panel and the optical member through the photocurable resin composition; FIG. 9D illustrates a step of performing a pressure defoaming treatment on the laminate by using an autoclave; FIG. 9E illustrates a step of irradiating the photocurable resin composition layer sandwiched between the optical member and the transparent panel with ultraviolet rays to form a cured resin layer; and FIG. 9F is a sectional view of the completed optical device.

FIG. 15A is a sectional view illustrating an example of a state in which the rarefied air confined during lamination aggregates in the final lamination portion to form bubbles as the result of expansion of the fill material in the lamination, and FIG. 15B is a plan view of this state.

FIG. 16A is sectional view illustrating an example of a state in which a laminate is subjected to pressure defoaming treatment by using an autoclave, and FIG. 16B is a plan view of this state.

FIGS. 17A and 17B are sectional views illustrating an example of a state in which the height of the dam member is made as close as possible to the thickness of the fill member.

DESCRIPTION OF EMBODIMENTS

Figure 1A:
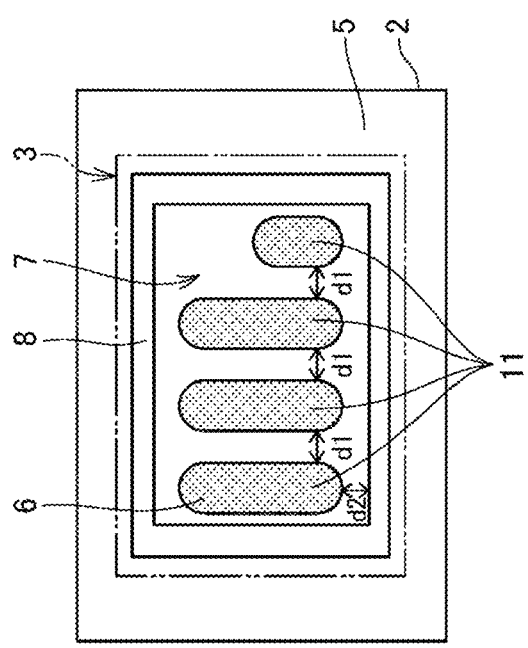

A method for manufacturing an optical device according to the present embodiment (hereinafter also referred to as the present manufacturing method) forms an optical device 1 by laminating a transparent panel 2 and an optical member 3 via a cured resin layer 4 (see FIG. 9F).

Transparent Panel

The transparent panel 2 has a light transmissivity that makes it possible to visually recognize an image formed on the optical member 3. Examples of the transparent panel 2 include glass and resin materials such as acrylic resin, polyethylene terephthalate, polyethylene naphthalate, and polycarbonate. The shape of the transparent panel 2 may be, for example, a plate shape or a sheet shape. The transparent panel 2 may be subjected to, e.g., a hard coat treatment or an antireflection treatment on at least one surface. The physical properties of the transparent panel 2 such as shape, thickness, and elastic modulus can be appropriately selected according to the purpose of use.

In the transparent panel 2, a light shielding portion 5 is formed in a region corresponding to the peripheral edge of the display region of the optical member 3. The light shielding portion 5 is provided for improving the contrast of the image. The light shielding portion 5 can be formed, for example, by applying a paint colored, e.g., in black by screen printing or the like, and then drying and curing the paint. The thickness of the light shielding portion 5 can be suitably changed in accordance with the purpose, for example, to 5 to 100 µm.

Optical Member

Examples of the optical member 3 include a liquid crystal display panel, an organic EL display panel, a plasma display panel, and a touch panel. Here, the touch panel means an image display/input panel in which a display element such as a liquid crystal display panel and a position input device such as a touch pad are combined.

Cured Resin Layer

The cured resin layer 4 is formed of a photocurable resin composition 6 to be described later. The refractive index of the cured resin layer 4 is preferably substantially equal to the refractive index of the transparent panel 2 and the optical member 3, and may be, for example, 1.45 to 1.55. This increases the luminance and contrast of the image light from the transparent panel 2 to improve visibility. The light transmittance of the cured resin layer 4 preferably exceeds 90%. This improves the visibility of the image. The thickness of the cured resin layer 4 can be suitably changed according to the purpose, for example, to 50 to 200 µm.

Step A

Figure 1B:
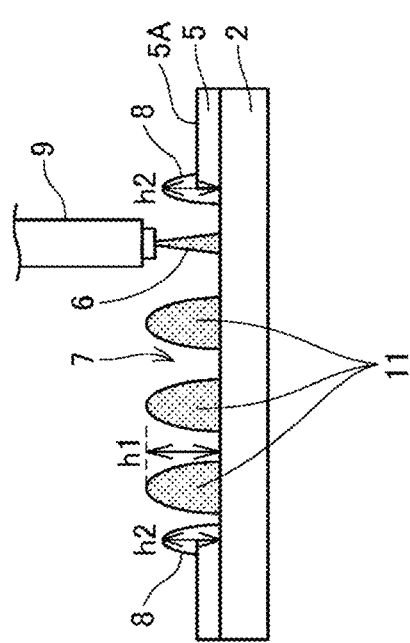

In Step A, for example, as shown in FIGS. 1A and 1B, the transparent panel 2 having the light shielding portion 5 is first prepared, and a wall portion 8 is formed on the surface of the transparent panel 2 to surround an application region 7 for the photocurable resin composition 6. The wall portion 8 defines the application region for the photocurable resin composition 6 constituting the cured resin layer 4 and prevents the photocurable resin composition 6 applied in Step B from protruding outside the wall portion 8. For example, as shown in FIG. 1A, the wall portion 8 is formed substantially in a frame shape along the light shielding portion 5 on a display area side 5A of the light shielding portion 5 formed in a frame shape. The wall portion 8 is formed so as to abut from the upper surface to the inside of the light shielding portion 5 when the optical member 3 and the transparent panel 2 are laminated in Step C of the present manufacturing method. The wall portion 8 may be formed from the upper surface of the light shielding portion 5 to the application region 7 side surrounded by the light shielding portion 5.

The wall portion 8 can be formed, for example, by using a curable resin composition capable of being cured with heat or light. The curable resin composition for the wall portion 8 may be applied in a substantially frame-like shape by a dispenser, for example. When a photocurable resin composition is used as the curable resin composition for the wall portion 8, the photocurable resin composition is cured by applying the photocurable resin composition and irradiating the photocurable resin composition with light (for example, ultraviolet rays) to form the wall portion 8. The wall portion 8 can be formed using a photocurable resin composition having the same components as the photocurable resin composition 6 applied in Step B.

The height of the wall portion 8 can be suitably changed according to the thickness of the cured resin layer 4 to be formed, and for example, can be set to 50 to 100 μm in a state of being sandwiched between the optical member 3 and the transparent panel 2.

Step B

Figure 2A:
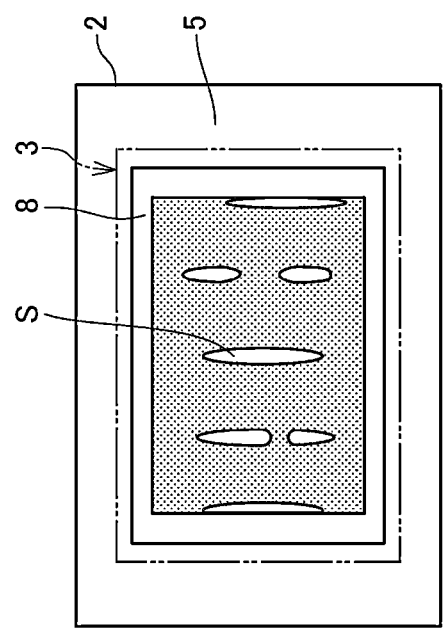
Figure 2B:
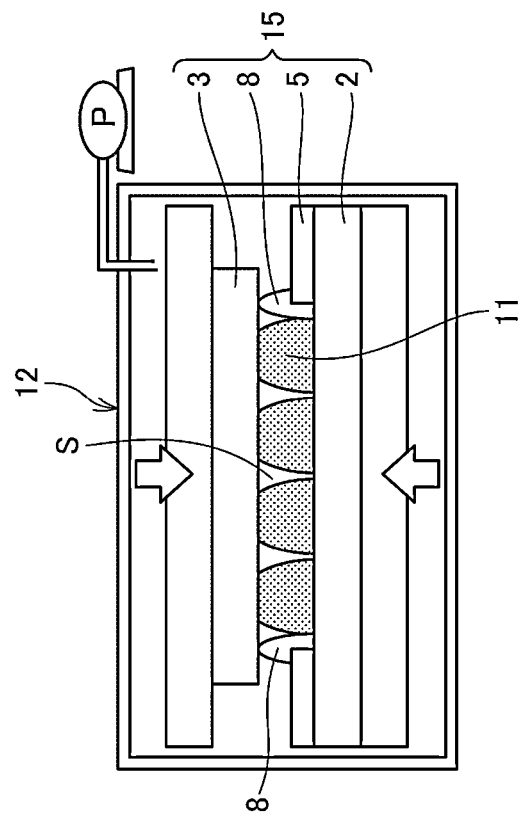
Figure 3A:
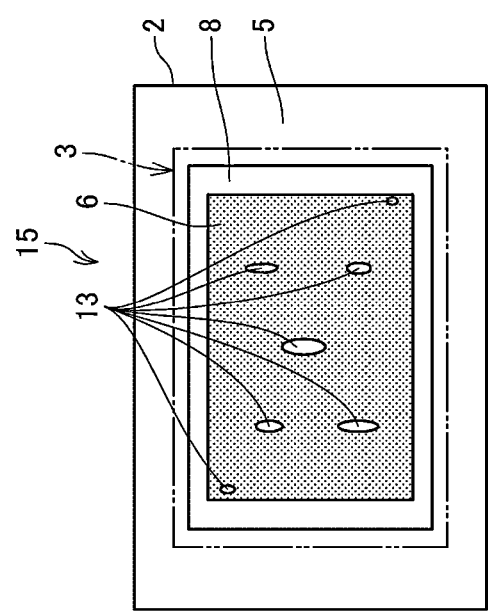
Figure 3B:
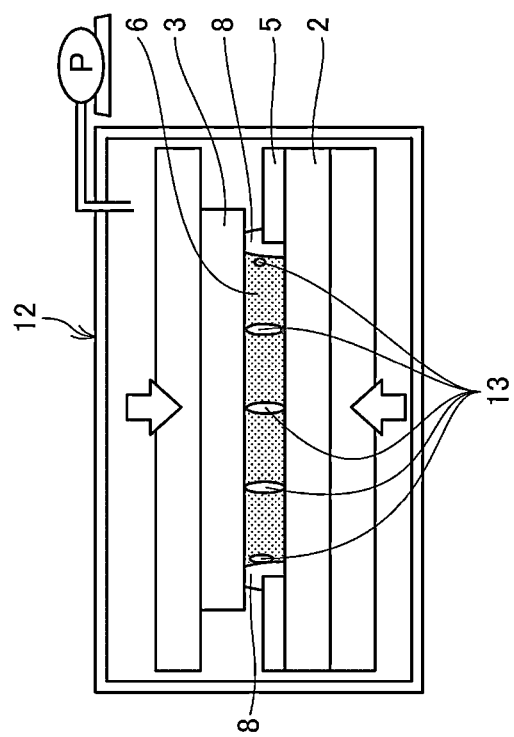

In Step B, for example, as shown in FIGS. 1A and 1B, the photocurable resin composition 6 is applied to the application region 7 surrounded by the wall portion 8. In Step B, for example, as shown in FIGS. 2A to 3B, the photocurable resin composition 6 is applied so that a laminate 15 to be formed in Step C will have a plurality of separated spaces separated by bubbles 13 formed in the thickness direction of the photocurable resin composition 6. In other words, in Step B, a photocurable resin composition pattern 11 is formed so that a large number of bubbles 13 are distributed across the plane of the photocurable resin composition 6 at the time of lamination in Step C. In Step B, it is preferable to apply the photocurable resin composition 6 so that the total application amount of the photocurable resin composition 6 reaches the target volume (thickness). By this Step B, as shown in FIGS. 3A and 3B, for example, the bubbles 13 tend to be ubiquitously distributed in the photocurable resin composition 6 of the laminate 15 formed in Step C. Therefore, in Step D, the bubbles 13 in the photocurable resin composition 6 can be more easily removed.

A specific example of Step B will be described below. In Step B, as shown in FIG. 1A, for example, the photocurable resin composition 6 is applied in a plurality of lines (streaks) from one or more needles 9 to the application region 7 surrounded by the wall portion 8 on the surface of the transparent panel 2 to form the photocurable resin composition pattern 11. In Step B, in order to prevent the photocurable resin composition 6 from protruding outside the wall portion 8 during the lamination in Step C (FIGS. 2A to 3B), it is preferable to adjust the distance between the photocurable resin composition patterns 11 (d1) and the distance between the wall portion 8 and the photocurable resin composition pattern 11 closest to the wall portion 8 (d2) to an appropriate range. The distance (d1) is preferably, for example, 2 to 4 mm. The distance (d2) is preferably, for example, 1 to 3 mm. Setting the distance (d1) and the distance (d2) within appropriate ranges effectively prevent the photocurable resin composition 6 from protruding to the outside of the wall portion 8 during the lamination in Step C. Further, setting the distance (d1) and the distance (d2) within appropriate ranges will make the bubbles 13 to be more ubiquitously distributed in the photocurable resin composition 6 of the laminate 15 formed in Step C, so that the bubbles 13 in the photocurable resin composition 6 can be more easily removed in Step D.

In Step B, the photocurable resin composition 6 is applied so that the height of the photocurable resin composition pattern 11 at least on the wall portion 8 side, for example, the photocurable resin composition pattern 11 closest to the wall portion 8 (h1) becomes higher than the height of the wall portion 8 (h2). Thus, in Step B, the height of the photocurable resin composition pattern 11 on the wall portion 8 side (h1) and the height of the wall portion 8 (h2) need not be as close as possible, so that it is possible to increase the degree of freedom regarding the height of the wall portion 8 and the plane accuracy of the laminator. It should be noted that, with regard to the photocurable resin composition pattern 11 other than the photocurable resin composition pattern 11 closest to the wall portion 8, the height (h1) may be made higher than the height of the wall portion 8 (h2), may be made equal to the height of the wall portion 8 (h2), or may be made lower than the height of the wall portion 8 (h2); it is, however, preferable that the height of all the photocurable resin composition patterns 11 (h1) be made higher than the height of the wall portion 8 (h2) so as to effectively achieving the effect of the present technology. For example, when the height of the wall portion 8 (h2) is 0.33 mm, the height of all the photocurable resin composition patterns 11 (h1) can be set to 0.40 to 0.50 mm.

Figure 12B:
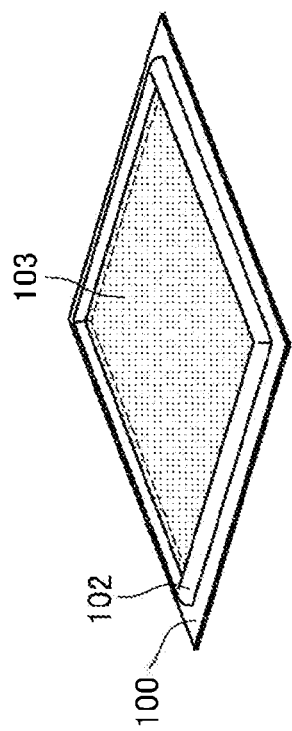
FIGS. 12A and 12B are perspective views for explaining a method of applying a photocurable resin composition by using a dispenser.
Figure 12A:
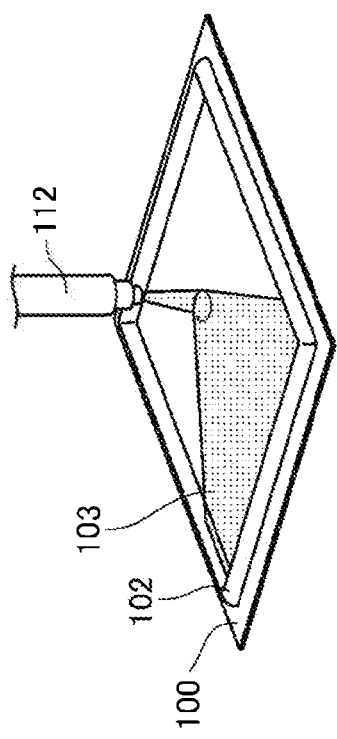
Figure 13:
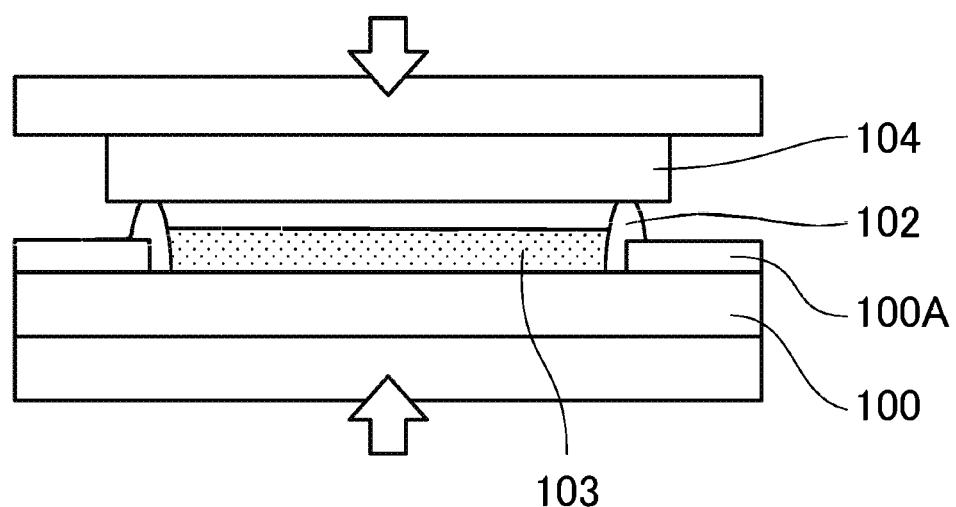
FIG. 13 is a sectional view illustrating an example of a lamination in which a transparent panel and an optical member are laminated via a photocurable resin composition by vacuum laminating.
Figure 14A:
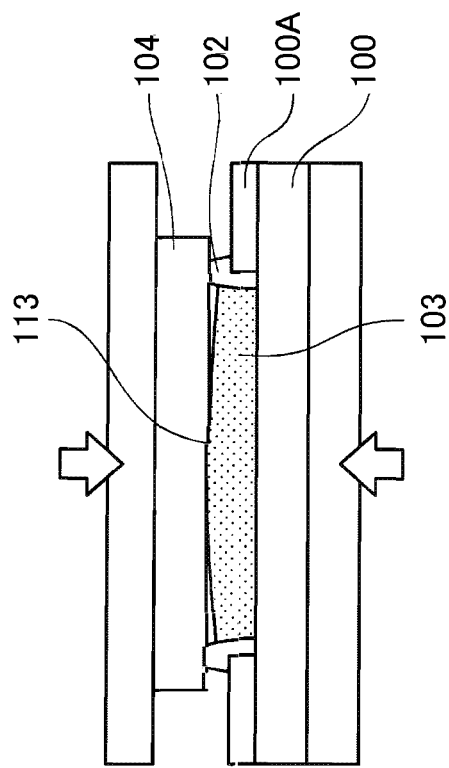
FIG. 14A is sectional view illustrating an example of a state in which, after the optical member and the dam member are laminated, the dam member is deformed and the fill member and the optical member are laminated.
Figure 14B:
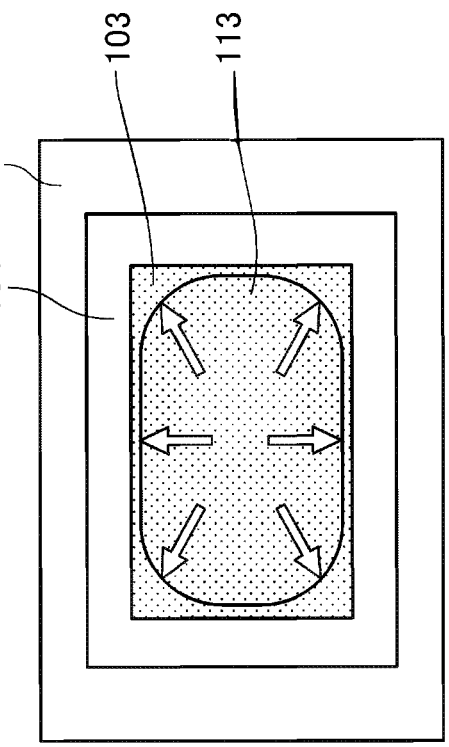
FIG. 14B is a plan view of this state.
Figure 18A:
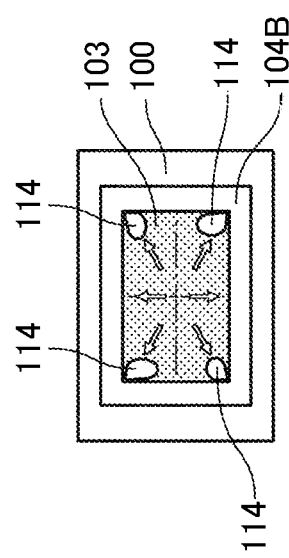
FIG. 18A is a plan view illustrating an example of a state of bubbles in a laminate when using a small panel as an optical member.
Figure 18B:
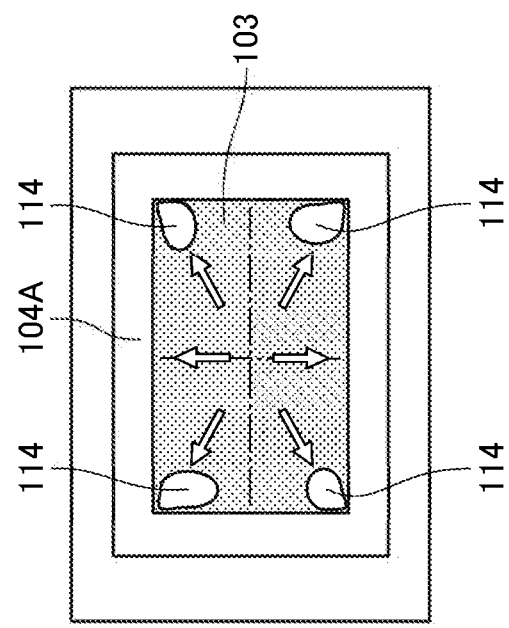
FIG. 18B is a plan view illustrating an example of a state of bubbles in a laminate when using a large panel as an optical member.

In Step B, as described above, by applying the photocurable resin composition 6 so that the laminate 15 formed in Step C has a plurality of separated spaces separated by the bubbles 13 formed in the thickness direction of the photocurable resin composition 6, as shown in FIGS. 12A and 12B, for example, it becomes possible to use a fill material having a higher viscosity (for example, about 80,000 mPa·s) or a fill material having a thixotropic property in contrast to the conventional method using a low viscosity fill material 103 having a rapid wetting and spreading property. The thixotropic property is a property in which viscosity changes in response to shear stress. The thixotropic fill material, for example, when discharged from the needle 9, has a low viscosity due to shearing stress, and returns to the original viscosity after discharge (in a state where no shearing stress is applied), so that the shape after discharge tends not to collapse. Since the present technology allows the use of a fill material having higher viscosity or a fill material having a thixotropic property, the height of the photocurable resin composition pattern 11 can be easily secured so that the height of the photocurable resin composition pattern 11 on the wall portion 8 side (h1) is higher than the height of the wall portion 8 (h2).

The application shape of the photocurable resin composition 6 in Step B is not limited to the linear pattern shown in FIG. 1A, and for example, may be a spiral pattern, a lattice pattern, a pulsating pattern, or a combination thereof. The photocurable resin composition 6 applied in Step B preferably has a viscosity of 1,000 to 10,000 mPa·s measured by a cone plate type viscometer at 25° C. or has a thixotropic property. The photocurable resin composition 6 preferably has a viscosity at 25° C. of 1,000 to 5,000 mPa·s, more preferably 2,000 to 4,500 mPa·s.

The photocurable resin composition 6 may contain, for example, a base component (component (a)), an acrylate monomer component (component (b)), a plasticizer component (component (c)), and a photopolymerization initiator (component (d)).

Component (a)

The component (a) is a film-forming component. The component (a) may be one containing at least one of an elastomer and an acrylic oligomer. Examples of the elastomer include an acrylic copolymer composed of a copolymer of an acrylic ester, a polybutene, and a polyolefin.

Examples of the acrylic oligomer includes a (meth) acrylate oligomer having polyisoprene, polyurethane, or polybutadiene, among others, as a backbone. In this specification, (meth) acrylate means an acrylate and a methacrylate. Preferred examples of (meth) acrylate oligomers having a polyisoprene backbone include esterified product of maleic anhydride adduct of polyisoprene polymer and 2-hydroxyethyl methacrylate UC102 (KURARAY) (molecular weight in terms of polystyrene: 17,000), UC203 (KURARAY) (molecular weight in terms of polystyrene: 35,000), and UC-1 (KURARAY) (molecular weight in terms of polystyrene: 25,000). Examples of the (meth) acrylic-type oligomers having a polyurethane backbone include aliphatic urethane acrylate (EBECRYL 230 (Daicel-Cytec) (molecular weight of 5,000) and UA-1 (Light Chemical), among others. As (meth) acrylate oligomer, known (meth) acrylate oligomer having a polybutadiene backbone may be employed.

Component (b)

Component (b) is used as a reactive diluent to impart sufficient reactivity and coatability, among others, to the photocurable resin composition. Examples of the component (b) include a (meth) acrylate monomer having a hydroxyl group (for example, 2-hydroxypropyl methacrylate), a (meth) acrylate monomer having an aromatic group (for example, benzyl acrylate), and a (meth) acrylate monomer having an alicyclic group (for example, dicyclopentenyloxyethyl methacrylate).

The total content of the component (a) and the component (b) in the photocurable resin composition may be, for example, 25 to 85 mass %. The component (a) and the component (b) may be used alone or in combination of two or more.

Component (c)

Component (c) is used to impart buffering properties to the cured resin layer and to reduce the curing shrinkage of the photocurable resin composition, and does not react with component (a) and component (b) during irradiation with ultraviolet rays. As the component (c), a solid tackifier or a liquid oil component can be used. Examples of the solid tackifier include: terpene-based resins such as terpene resin, terpene phenol resin, and hydrogenated terpene resin; and rosin-based resins such as natural rosin, polymerized rosin, rosin ester, and hydrogenated rosin. Examples of the liquid oil component include polybutadiene oil and polyisoprene oil. The content of the component (c) in the photocurable resin composition may be, for example, 10 to 65 mass %. The component (c) may be used alone or in combination of two or more.

Component (d)

As the photopolymerization initiator designated as the component (d), known photo radical polymerization initiators can be used, which include 1-hydroxy-cyclohexyl phenyl ketone (IRGACURE 184, BASF), 2-hydroxy-1-{4-[4-(2-hydroxy-2-methyl-propionyl) benzyl] phenyl}-2-methyl-1-propan-1-one (IRGACURE 127, BASF), benzophenone, and acetophenone, among others. The content of component (d) may be 0.1 to 5 parts by mass with respect to the total of 100 parts by mass of component (a) and component (b).

The photocurable resin composition may further contain an adhesion improving agent such as a silane coupling agent and a common additive such as an antioxidant as required.

Step C

In Step C, for example, as shown in FIGS. 2A to 3B, the optical member 3 and the transparent panel 2 are laminated together via the photocurable resin composition 6 under a reduced-pressure atmosphere lower than the atmospheric pressure to form the laminate 15. In other words, in Step C, the laminate 15 is formed by vacuum laminating using a vacuum laminator 12 to laminate the transparent panel 2, the photocurable resin composition 6, and the optical member 3 in this order.

The reduced-pressure atmosphere lower than the atmospheric pressure is, for example, a low vacuum, a medium vacuum, a high vacuum, or an ultrahigh vacuum state, and specifically, the pressure is preferably 1,000 Pa or less, more preferably 100 Pa or less, and still more preferably 60 Pa or less. The lower limit of the degree of vacuum is not particularly limited, but in order to avoid an increase in the cost of the vacuum laminator 12 and an increase in the cycle time, for example, 0.1 Pa or more is preferable, and 10 Pa or more is more preferable. The optical member 3 and the transparent panel 2 can be laminated by using, for example, the vacuum laminator 12 capable of producing a reduced-pressure atmosphere state lower than atmospheric pressure.

As described above, the height of the photocurable resin composition pattern 11 (h1) applied in Step B is higher than the height of the wall portion 8 (h2). Therefore, in Step C, when the optical member 3 and the transparent panel 2 are laminated together under a reduced-pressure atmosphere lower than the atmospheric pressure, the optical member 3 and the photocurable resin composition pattern 11 first come into contact with each other. When the optical member 3 and the photocurable resin composition pattern 11 come into contact with each other, the plane of the photocurable resin composition is divided into a plurality of portions by the effect of the photocurable resin composition pattern 11 (FIGS. 2A and 2B). In other words, a plurality of closed spaces S (separated spaces) are formed. As the lamination of the transparent panel 2 and the optical member 3 progresses, a plurality of minute bubbles 13 are distributed across the plane of the photocurable resin composition 6 (FIGS. 3A and 3B). The number of bubbles 13 increases or decreases depending on the spreading state of the photocurable resin composition 6. As an example, as shown in FIGS. 1A and 1B, when four linear photocurable resin composition patterns 11 are formed in parallel at intervals of d1 in Step B, the plane of the photocurable resin composition 6 is divided into at least five spaces (FIGS. 2A and 2B) in Step C, and as the lamination of the transparent panel 2 and the optical member 3 progresses, seven bubbles 13 are distributed across the plane of the photocurable resin composition 6 (FIGS. 3A and 3B).

A part of the minute bubbles 13 disappears even at normal pressure as the lamination of the transparent panel 2 and the optical member 3 progresses. The size of the bubble 13 after laminating the optical member 3 and the transparent panel 2 in Step C tends to be smaller in the central portion of the photocurable resin composition 6 than in the peripheral portion shown in FIG. 3A. For example, the size of the bubble 13 can be 0.1 mm or less in the central portion of the photocurable resin composition 6 shown in FIG. 3A, and about 0.3 to 1.0 mm in the peripheral portion of the photocurable resin composition 6. The bubbles 13 having the size of 1.0 mm or less after the lamination in Step C tend to disappear as the lamination of the transparent panel 2 and the optical member 3 progresses. Therefore, in the laminate 15 formed in Step C, the size of the bubbles 13 in the photocurable resin composition 6 is preferably 1.0 mm or less, more preferably 0.5 mm or less.

As described above, since the laminate 15 formed in Step C has a plurality of separated spaces separated by the bubbles 13 formed in the thickness direction of the photocurable resin composition 6, and the bubbles 13 are ubiquitously distributed in the plane of the photocurable resin composition 6, the bubbles 13 in the photocurable resin composition 6 can be more easily removed in Step D.

Step D

Figure 4A:
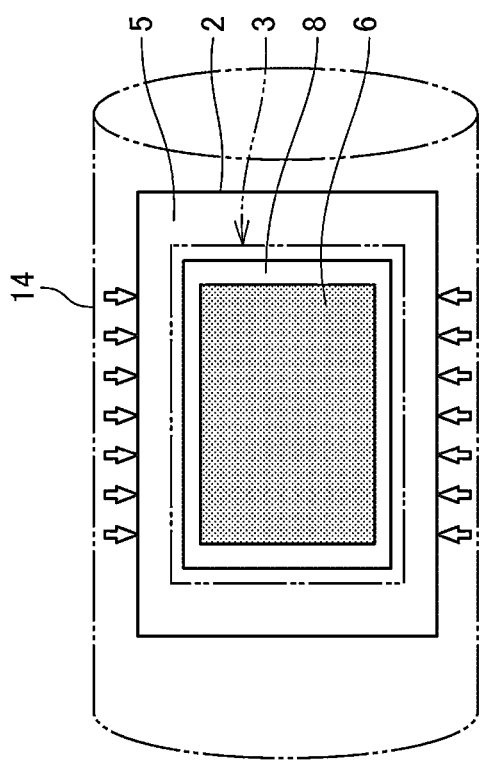
Figure 4B:
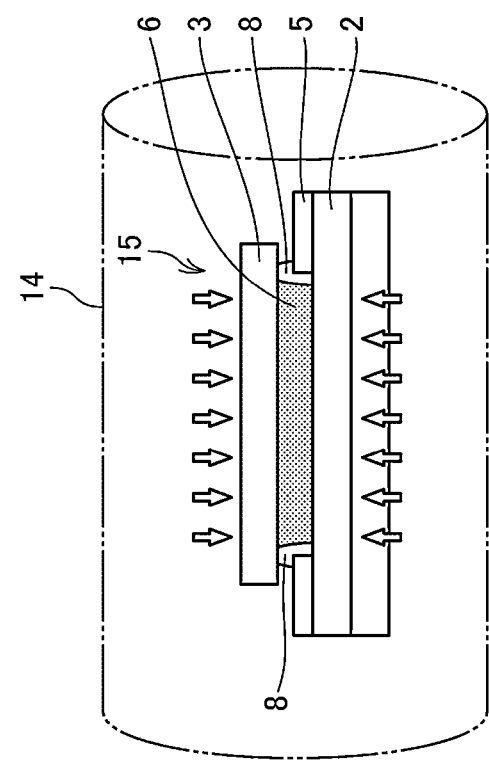

In Step D, as shown in FIGS. 4A and 4B, the bubbles 13 in the photocurable resin composition 6 are removed by pressurizing the laminate 15 formed in Step C. As the method of pressurizing the laminate 15, any pressure defoaming treatment may be employed. For example, in Step D, the laminate is preferably pressurized by using an autoclave 14 at a pressure of 0.2 to 0.8 MPa and a temperature of 25 to 60° C. for 5 to 30 minutes. The number of gas molecules in the bubble 13 is proportional to the product of the degree of vacuum (pressure) and the volume. Therefore, the minute bubbles 13 distributed across the plane of the photocurable resin composition 6 in Step C can be easily removed in Step D.

Step E

In Step E, the photocurable resin composition 6 of the laminate 15 formed in Step D is irradiated with light to cure the photocurable resin composition 6. For example, in Step E, the cured resin layer 4 is formed by irradiating the photocurable resin composition 6 sandwiched between the optical member 3 and the transparent panel 2 with ultraviolet rays from the transparent panel 2 side by using an ultraviolet ray irradiator. The light irradiation in Step E is performed so that the curing rate (gel fraction) of the cured resin layer 4 is preferably 90% or more, more preferably 95% or more.

As described above, according to the present manufacturing method, the height of the photocurable resin composition pattern 11 at least on the side of the wall portion 8 is made higher than the height of the wall portion 8 in Step B, and the photocurable resin composition 6 is applied so that the laminate 15 formed in Step C has a plurality of separated spaces separated by the bubbles 13 formed in the thickness direction of the photocurable resin composition 6. Thus, the laminate 15 formed in Step C has a plurality of separated spaces separated by the bubbles 13 formed in the thickness direction of the photocurable resin composition 6, and the bubbles 13 tend to be ubiquitously distributed in the plane of the photocurable resin composition 6. Therefore, the present manufacturing method can easily remove the bubbles 13 in the photocurable resin composition 6 in Step C.

The present manufacturing method can easily remove the bubbles even for a large panel or an irregular panel, from which the bubbles have been difficult to remove in the conventional manufacturing method. Therefore, it is possible to use a liquid photocurable resin composition having high printing step followability and high adhesive strength, thereby improving the quality and the productivity of the optical device. Further, according to the present manufacturing method, since the photocurable resin composition 6 is applied in Step B so that the laminate 15 formed in Step C has a plurality of separated spaces separated by the bubbles 13 formed in the thickness direction of the photocurable resin composition 6, it is possible to reduce the time from the application of the photocurable resin composition 6 (fill material) to the lamination in Step C as compared with a conventional method using the fill material 103 having a low viscosity and a rapid wetting and spreading property, for example, as shown in FIGS. 12A and 12B.

EXAMPLES

Examples of the present technology will be described below. The present technology is not limited to the following examples.

Example 1

Step A

In Example 1, as shown in FIG. 5A, a specially formed cover glass 17 (130 mm×300 mm, thickness 0.3 mm) was prepared which has the light shielding portion 5 formed in a region corresponding to the peripheral edge of the display region of a liquid crystal display panel 16 so as to surround the application region for the photocurable resin composition. The photocurable resin composition was applied to the display region side on the light shielding portion 5 of the cover glass 17 to form a wall portion 8A having a height of 0.3 mm and a width of 1 mm. Here, a photocurable resin composition having a viscosity at 25° C. of 3,700 mPa·s was used as the photocurable resin composition. The photocurable resin composition is applied by using a dispenser (available from Musashi Engineering, model number 350 PC).

Step B

The photocurable resin composition 6 was applied as a plurality of parallel linear patterns onto an application region 7A surrounded by the wall portion 8A to form photocurable resin composition patterns 11A. Specifically, the photocurable resin composition 6 was applied so that the distance between the curable resin composition patterns 11A (d1) was set to 4 mm and the distance between the curable resin composition pattern 11A closest to the wall portion 8A and the wall portion 8A (d2) was set to 3 mm (FIG. 5A). All of the curable resin composition patterns 11A were made higher than the wall portion 8A.

Step C

The laminate 15 was formed by laminating the cover glass 17 and the liquid crystal display panel 16 through the photocurable resin composition 6 by using a vacuum laminator (available from Takatori) under conditions of a vacuum degree of 50 Pa, a laminating pressure of 0.01 MPa, a laminating time of 10 seconds, and a temperature of 25° C. (FIG. 5B). In the laminate 15, bubbles 13 were ubiquitously distributed in the photocurable resin composition 6.

Step D

The laminate 15 was pressurized by using the autoclave 14 (Product name: TBR 600, available from Chiyoda Electric) at a pressure of 0.5 MPa at room temperature for 20 minutes (FIG. 5C). It was confirmed that the bubbles 13 in the photocurable resin composition 6 were removed from the laminate 18A after the pressurization (FIG. 5D).

Step E

The photocurable resin composition 6 of the laminate 18A after pressurization was irradiated with ultraviolet rays to cure the photocurable resin composition 6. Thus, the optical device was formed in which the cover glass 17 and the liquid crystal display panel 16 were laminated together via the cured resin layer 4.

Example 2

Figure 6A:
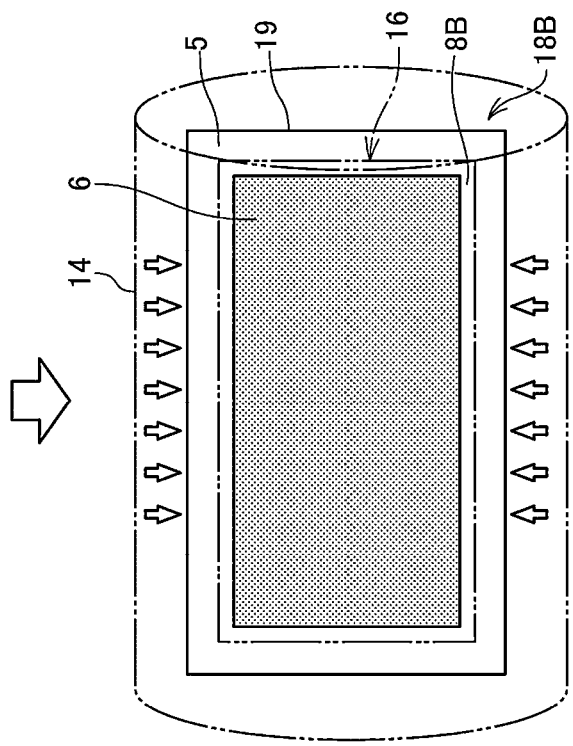
FIG. 6A is a plan view for explaining Step B of Example 2 of the method for manufacturing an optical device.
Figure 6B:
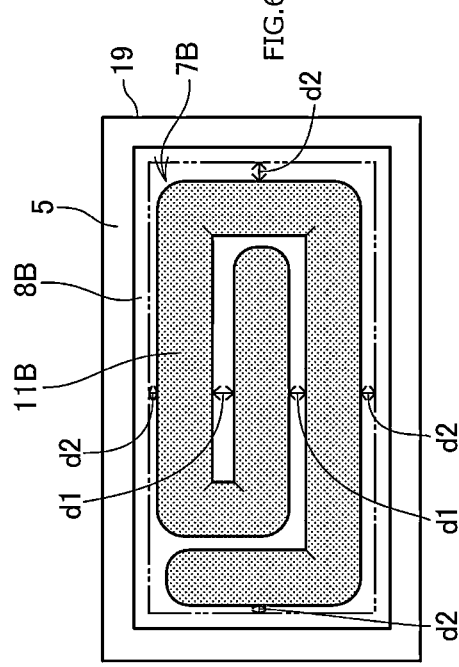
FIG. 6B is a plan view for explaining Step C.
Figure 6C:
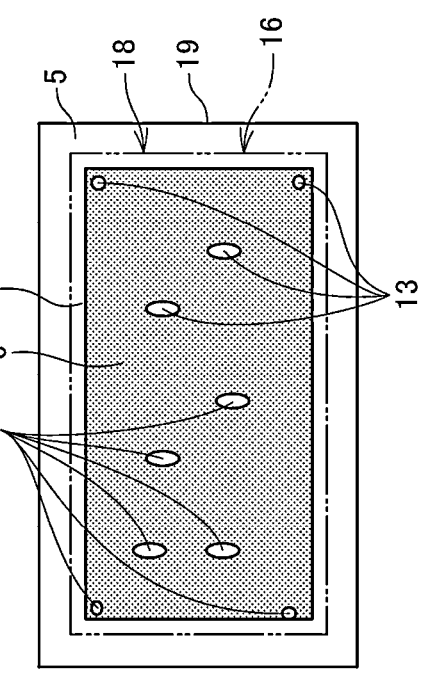
FIG. 6C is a plan view for explaining Step D.

In Example 2, an optical device was prepared in the same manner as in Example 1 except that, in Step A, as shown in FIG. 6A, a cover glass 19 (130 mm×300 mm, thickness 0.3 mm) was prepared which has the light shielding portion 5 formed in a region corresponding to the peripheral edge of the display region of the liquid crystal display panel 16, and in Step B, as shown in FIG. 6A, the photocurable resin composition 6 was spirally applied to an application region 7B to form a photocurable resin composition pattern 11B. Specifically, in Example 2, in the application of the photocurable resin composition 6 in a spiral shape, the distance between the photocurable resin composition patterns 11B (d1) was set to 4 mm, and the distance between the photocurable resin composition pattern 11B closest to a wall portion 8B and the wall portion 8B (d2) was set to 3 mm. In Example 2, as with Example 1, it was confirmed that the bubbles 13 in the photocurable resin composition 6 were removed from the laminate 18B after being pressurized by the autoclave 14 (FIGS. 6B and 6C).

Example 3

Figure 7C:
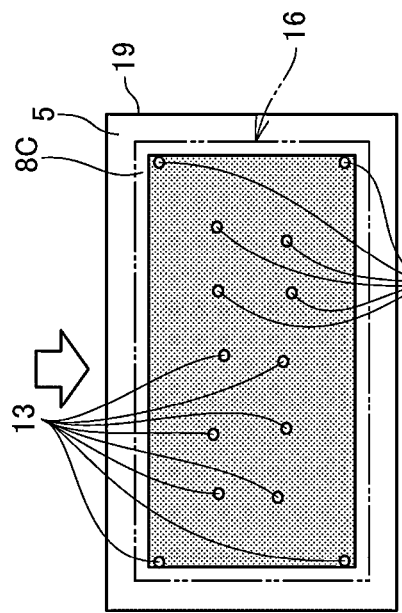
FIG. 7C is a plan view for explaining Step C.
Figure 7D:
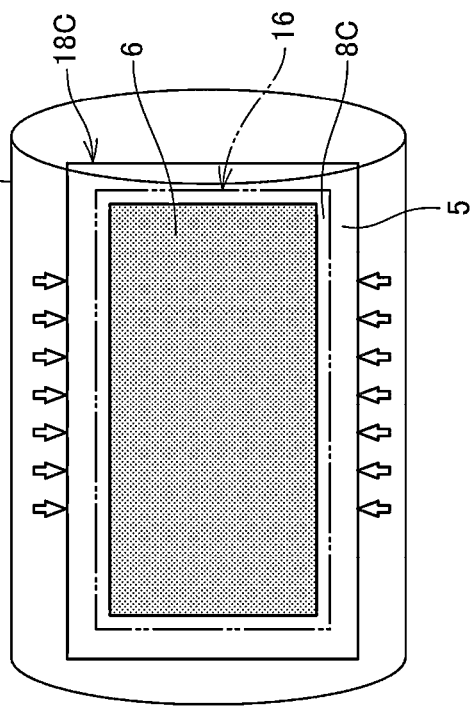
FIG. 7D is a plan view for explaining Step D.
Figure 7A:
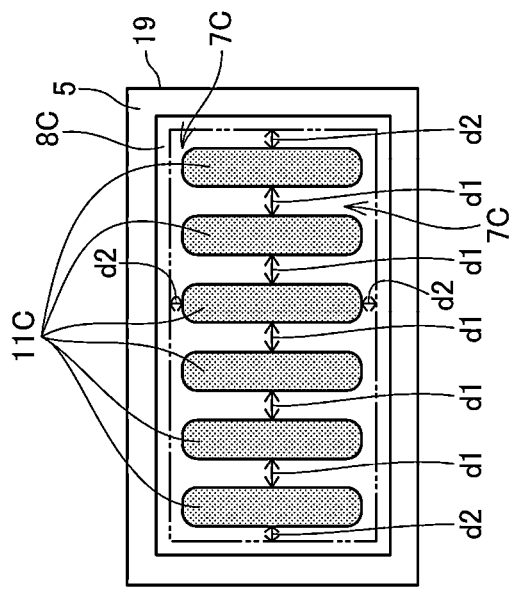
FIG. 7A is a plan view for explaining Step B of Example 3 of the method for manufacturing an optical device.
Figure 7B:
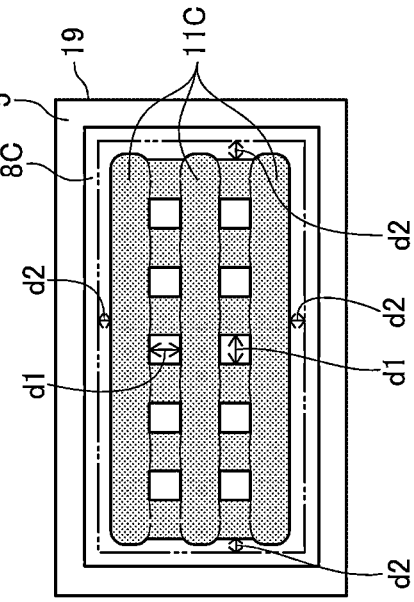
FIG. 7B is a plan view for explaining Step B.

In Example 3, an optical device was prepared in the same manner as in Example 1 except that, in Step A, as shown in FIG. 7A, the cover glass 19 (130 mm×300 mm, thickness 0.3 mm) was prepared which has the light shielding portion 5 formed in a region corresponding to the peripheral edge of the display region of the liquid crystal display panel 16, and in Step B, as shown in FIG. 7B, the photocurable resin composition was applied in a grid pattern (crossed lattice pattern) to an application region 7C to form a photocurable resin composition pattern 11C.

Specifically, in Example 3, as shown in FIG. 7A, the application of the photocurable resin composition 6 in six parallel linear patterns in Step B is performed such that the distance between the photocurable resin composition patterns 11C (d1) was set to 4 mm, and the distance between the photocurable resin composition pattern 11C closest to a wall portion 8C and the wall portion 8C (d2) was set to 3 mm. Subsequently, as shown in FIG. 7B, on the six photocurable resin composition patterns 11C, three parallel photocurable linear patterns of the resin compositions were applied so as to be perpendicular to the previously formed photocurable resin composition pattern 11C to further form the photocurable resin composition pattern 11C. Thus, in Example 3, the inside of the photocurable resin composition pattern 11C was divided into ten portions, and a space was formed between the photocurable resin composition pattern 11C and the wall portion 8C (the outer periphery of the photocurable resin composition pattern 11C) (FIG. 7B). As the lamination of the cover glass 19 and the liquid crystal display panel 16 progressed, a total of fourteen (ten in the center and four in the periphery) bubbles 13 were ubiquitously distributed in the plane of the photocurable resin composition 6 (FIG. 7C).

In Example 3, as shown in FIG. 7C, it was found that the number of the bubbles 13 after vacuum lamination and before pressurization by the autoclave 14 was reduced as compared with Examples 1 and 2. Further, in Example 3, it was found that the bubbles 13 can be removed more easily by an autoclave than in Examples 1 and 2. It is considered that this is because in Example 3, the number of separated spaces formed in the plane of the photocurable resin composition is increased by increasing the number of the photocurable resin composition patterns as compared with Example 1, and as a result, the bubbles are more finely divided.

Example 4

Figure 8A:
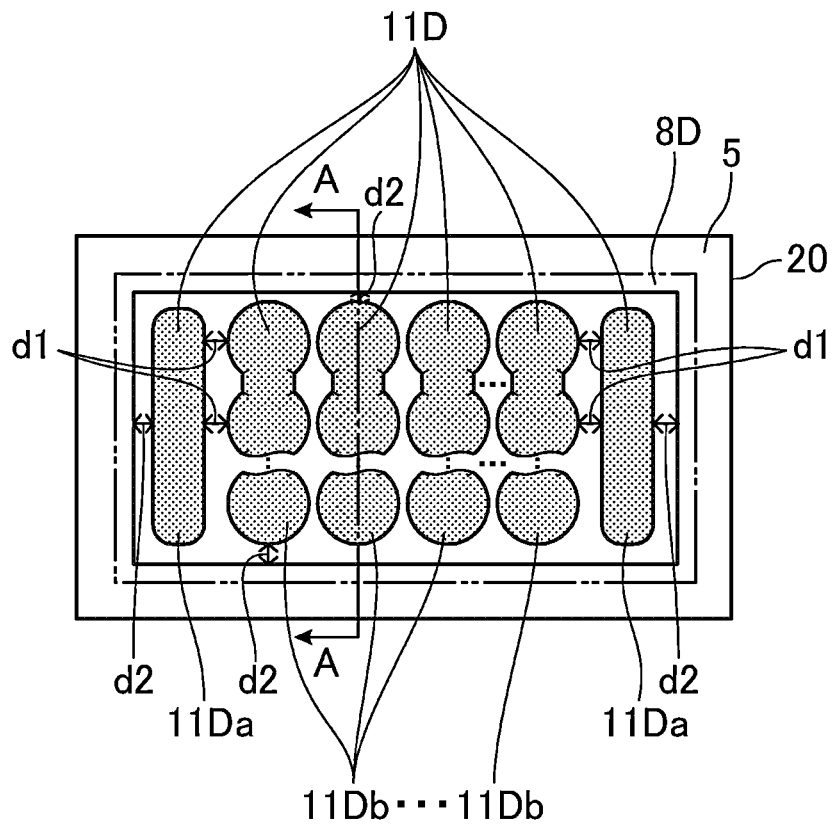
FIG. 8A is a plan view for explaining Step B of Example 4 of the method for manufacturing an optical device.
Figure 8B:
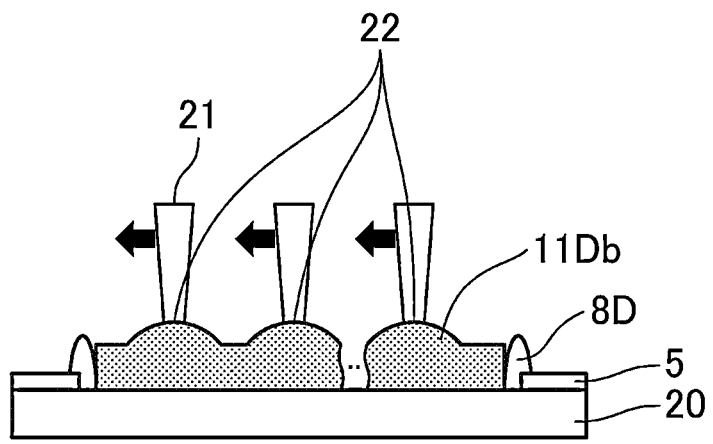
FIG. 8B is a sectional view taken along line A-A in FIG. 8A.

In Example 4, an optical device was prepared in the same manner as in Example 1 except that, in Step A, as shown in FIG. 8A, a cover glass 20 (60 mm×110 mm, thickness 0.1 mm) was prepared which has the light shielding portion 5 formed in a region corresponding to the peripheral edge of the display region of the liquid crystal display panel 16, and in Step B, as shown in FIGS. 8A and 8B, the photocurable resin composition 6 was applied to a pattern consisting of a combination of a linear pattern and a pulsating pattern to form a photocurable resin composition pattern 11D.

Specifically, in Step B, as shown in FIG. 8A, the distance between the photocurable resin composition patterns 11D (d1) was set to 4 mm, and the distance between the photocurable resin composition pattern 11D closest to a wall portion 8D and the wall portion 8D (d2) was set to 3 mm. In Step B, as shown in FIG. 8B, convex portions 22 having a locally increased height and width of the photocurable resin composition pattern 11D were formed by increasing the discharge amount of the photocurable resin composition 6 or decreasing the speed of the dispenser 21 at portions for making intended division. Thus, a total of thirteen rows of the photocurable resin composition pattern 11D, i.e., as shown in FIG. 8A, a photocurable resin composition pattern 11Da having two linear pattern of rows at both ends and a photocurable resin composition pattern 11Db having a total of eleven rows of intermittently non-uniform width and height were formed. Each photocurable resin composition pattern 11Db had six convex portions 22 in the vertical direction in FIG. 8A.

In Step C, as shown in FIGS. 8C to 8E, as the lamination of the cover glass 20 and the liquid crystal display panel 16 progressed, the photocurable resin composition pattern 11D spreads non-uniformly (in a pulsated manner) between the cover glass 20 and the liquid crystal display panel 16 to form a plurality of closed spaces 23 (FIG. 8E). In the state shown in FIG. 8E, the inner surface of the photocurable resin composition 6 was divided into approximately ninety eight portions, and the formed closed spaces 23 were more finely divided than in the cases of Examples 1 to 3.

Figure 8F:
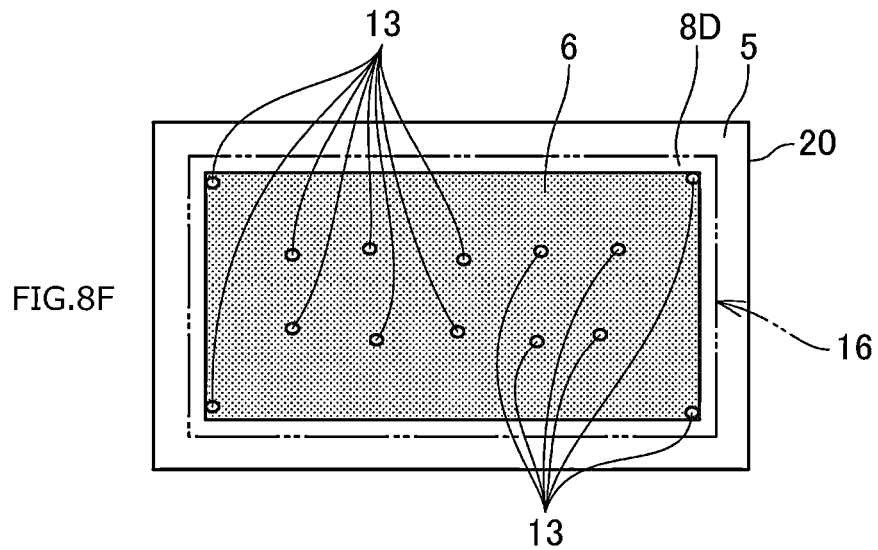
FIG. 8F is a plan view for explaining Step C.
Figure 8G:
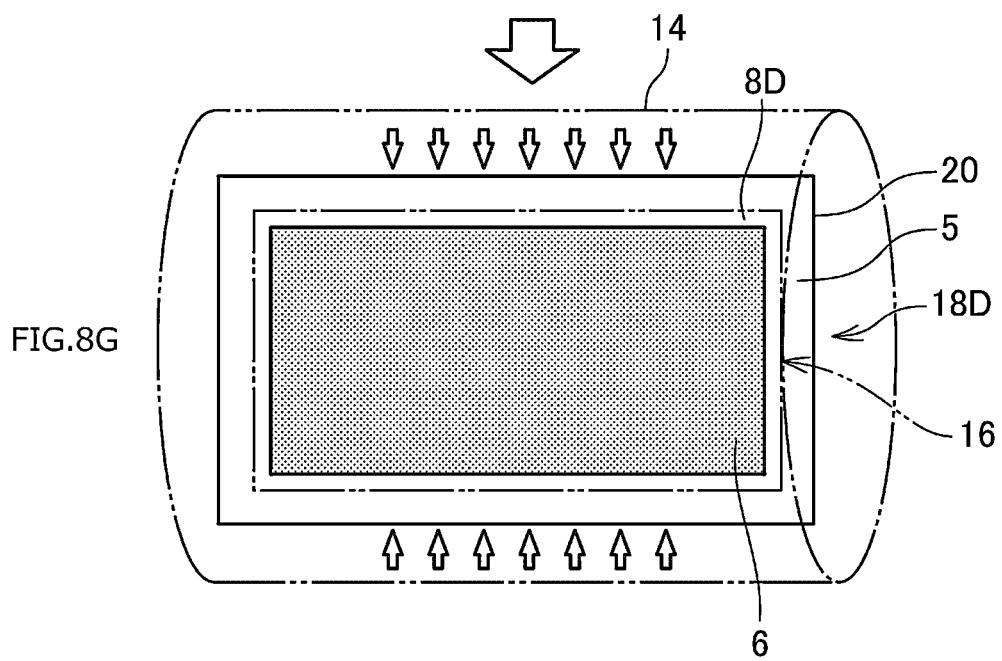
FIG. 8G is a plan view for explaining Step D.
Figure 10B:
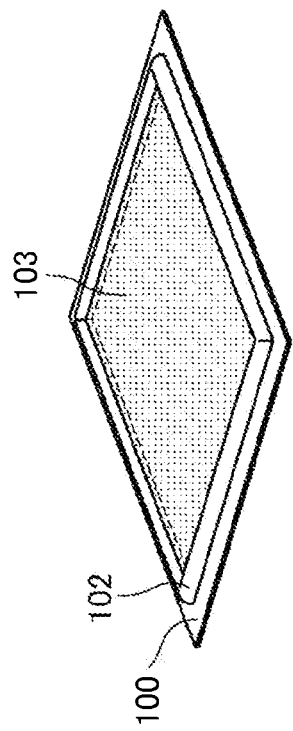
FIGS. 10A and 10B are perspective views for explaining a method of applying a photocurable resin composition by using a slit nozzle.
Figure 10A:
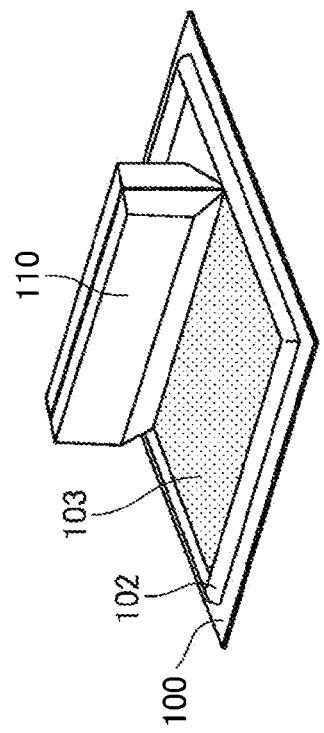
Figure 11B:
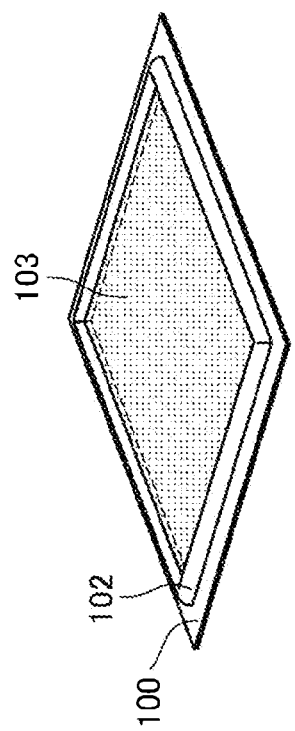
FIGS. 11A and 11B are perspective views for explaining a method of applying a photocurable resin composition by using a multi nozzle.
Figure 11A:
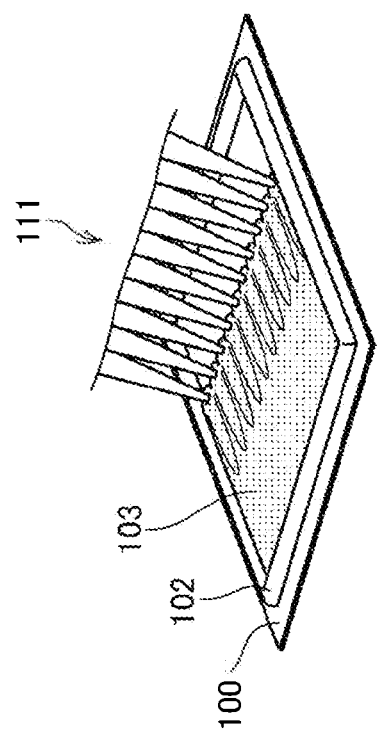

In this Example 4, as shown in FIG. 8F, it was found that the number of the bubbles 13 after vacuum lamination and before pressurization by the autoclave 14 was reduced as compared with Examples 1 and 2. It was also found that in Example 4, the bubbles 13 can be removed more easily by the autoclave 14 than Examples 1 and 2 without increasing the cycle time as compared with Examples 1 and 2.

REFERENCE SIGNS LIST 1 optical device, 2 transparent panel, 3 optical member, 4 cured resin layer, 5 light shielding portion, 6 photocurable resin composition, 7, 7A, 7B, 7C application regions, 8, 8A, 8B, 8C, 8D wall portions, 9 needle, 11, 11A, 111B, 11C, 11D photocurable resin composition pattern, 12 vacuum laminator, 13 bubbles, 14 autoclave, 15 laminate, 16 liquid crystal display panel, 17 cover glass, 18, 18A, 18B, 18C, 18D laminate after pressurization, 19 cover glass, 20 cover glass, 21 dispenser, 22 convex portion, 23 closed space, 100 transparent panel, 100A light shielding portion, 101 application region, 102 wall portion (dam material), 103 photocurable resin composition (fill material), 104 optical member, 105 laminate, 106 temporarily cured resin layer, 107 autoclave, 108 ultraviolet rays, 109 cured resin layer, 110 slit nozzle, 111 multi nozzle, 112 dispenser, 113 part, 114 bubbles, 115 optical device

The invention claimed is:

1. A method for manufacturing an optical device, comprising:

forming a wall portion surrounding an application region for a photocurable resin composition on an optical member which comprises a liquid crystal display panel, an organic EL display panel, or a plasma display panel or a transparent panel which is to be laminated on the optical member;

applying a photocurable resin composition to the application region;

laminating the optical member and the transparent panel via the photocurable resin composition under a reduced-pressure atmosphere lower than atmospheric pressure to form a laminate;

performing a pressure defoaming treatment on the laminate; and irradiating the photocurable resin composition of the laminate with light to form a fully cured resin layer, after the pressure defoaming treatment, wherein the photocurable resin composition is applied to have an application pattern comprising plural line portions which have a uniform width or an uneven width, the plural line portions having a space between each other, the application pattern having a height on a side of the wall portion higher than a height of the wall portion, so that when the laminate is formed, the photocurable resin composition touches both the transparent panel and the optical member before the wall portion touches both the transparent panel and the optical member, and the laminate has a plurality of separated bubbles derived from the space between the plural line portions in a thickness direction of the photocurable resin composition.

2. The method for manufacturing an optical device according to claim 1, wherein in the applying of the photocurable resin composition, the photocurable resin composition is applied so that the bubbles are ubiquitously distributed in the photocurable resin composition of the laminate when the laminate is formed.

3. The method for manufacturing an optical device according to claim 1, wherein the reduced-pressure atmosphere has a pressure of 100 Pa or less.

4. The method for manufacturing an optical device according to claim 1, wherein in the applying of the photocurable resin composition, the application pattern of the photocurable resin composition comprises at least one pattern selected from the group consisting of a linear pattern having a uniform width or an uneven width, a spiral pattern and a lattice pattern.

5. The method for manufacturing an optical device according to claim 1, wherein the photocurable resin composition has a viscosity of 1,000 to 10,000 mPa·s at 25° C. or a thixotropic property.

6. The method for manufacturing an optical device according to claim 1, wherein the transparent panel comprises a light shielding portion formed in a region corresponding to a peripheral edge of a display region of the optical member, and the wall portion is formed on a display region side of the light shielding portion.

7. The method for manufacturing an optical device according to claim 1, wherein the wall portion comprises a photocurable resin composition having the same components as components of the photocurable resin composition applied to the application region.

8. The method for manufacturing an optical device according to claim 1, wherein an entire portion of the application pattern of the photocurable resin composition has heights higher than a height of the wall portion.

9. The method for manufacturing an optical device according to claim 1, wherein each width of the space between the plural line portions and a distance between the wall portion and the application pattern closest to the wall portion is adjusted so that the laminate has a plurality of separated bubbles formed in the thickness direction of the photocurable resin composition when the laminate is formed.

10. The method for manufacturing an optical device according to claim 1, wherein a cured product of the photocurable resin composition has a refractive index of from 1.45 to 1.55.

11. The method for manufacturing an optical device according to claim 1, wherein each of the plural line portions of the application pattern has a height higher than the height of the wall portion.

* * * * *